Figure 1:
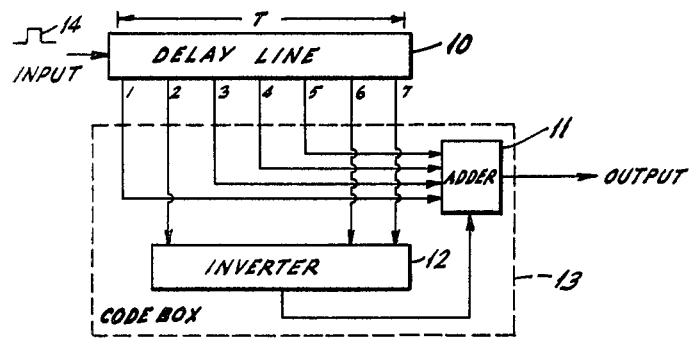

United States Patent [19]

Hauer

[11] 4,247,942
[45] Jan. 27, 1981

[54] JAM RESISTANT COMMUNICATION SYSTEM

[75] Inventor: Charles A. Hauer, Plymouth Meeting, Pa.

[73] Assignee: Ford Aerospace & Communications Corp., Detroit, Mich.

[21] Appl. No.: 92,709

[22] Filed: Mar. 1, 1961

[51] Int. Cl.³ .................................... H04L 15/00
[52] U.S. Cl. ........................... 375/25; 340/167 B; 375/2; 375/58; 375/96
[58] Field of Search ............... 178/22; 250/8 A, 8 T, 250/8.31; 325/32; 328/38; 375/2, 25, 58, 96, 110; 455/26; 340/167 B

[56] References Cited

U.S. PATENT DOCUMENTS

| | | | |
|---|---|---|---|
| 2,982,853 | 5/1961 | Price et al. | 375/58 |
| 3,016,519 | 1/1962 | Lindner | 340/167 B |
| 3,027,543 | 3/1962 | Losee et al. | 340/167 B |
| 3,105,197 | 9/1963 | Aiken | 340/167 B |

Primary Examiner—Howard A. Birmiel

Attorney, Agent, or Firm—Robert D. Sanborn; Paul K. Godwin, Jr.

EXEMPLARY CLAIM

1. In a communication system, a first delay line having multiple spaced taps, means for supplying successive input pulses to said delay line, whereby in response to each input pulse variously delayed pulses appear at the taps of said delay line, means for deriving from said taps pulses representative of a MARK, means for also deriving from said taps pulses representative of a SPACE, means for selecting the MARK and SPACE representative pulses according to sigal intelligence representable by MARKS and SPACES, means for effecting carrier transmission of the selected pulses, means for receiving the carrier-transmitted pulses, a pair of synchronous detectors, means for supplying the carrier-transmitted pulses to said detectors, means for supplying phase quadrature related local oscillations respectively to said detectors, a second multi-tap delay line which is the conjugate of said first delay line, means for driving said second delay line from said detectors, and means for deriving the transmitted MARK-representative and SPACE-representative pulses from said second delay line.

11 Claims, 10 Drawing Figures

JAM RESISTANT COMMUNICATION SYSTEM

This invention relates to intelligence transmission and receiving systems which are particularly applicable to military purposes, such as guidance control of aircraft and missiles, and are subject to enemy jamming attempts. A major objective in the design of any such system is to make it as jam resistant as possible.

Prior systems of this type have required very close synchronization of two oscillators, one at the transmitter and the other at the receiver, and therefore application of such systems has been limited, particularly where high velocity aircraft are involved and doppler shifts are encountered.

The principal object of the present invention is to provide an improved jam resistant communication system which does not require synchronization between the receiver and the transmitter.

In the system provided by this invention, two pseudo-random waveforms are produced simultaneously which actually are representative respectively of a MARK and a SPACE. These two waveforms are produced recurrently and they are selectively transmitted according to the intelligence to be transmitted. At the receiver two synchronous detectors operating in quadrature phase relation derive the transmitted waveforms which are translated into MARKS and SPACES. This system makes use of the principle of conjugate filters or delay lines as hereinafter explained, and by the use of the synchronous detectors it eliminates the need for synchronization between oscillators at the transmitter and receiver.

Figure 9:
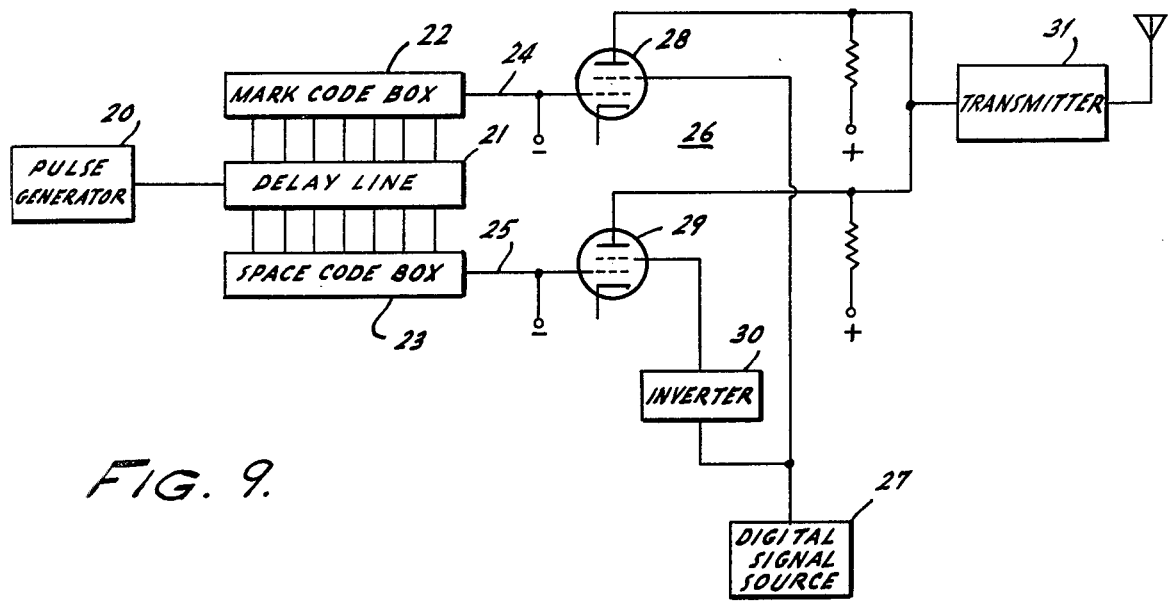
Figure 10:
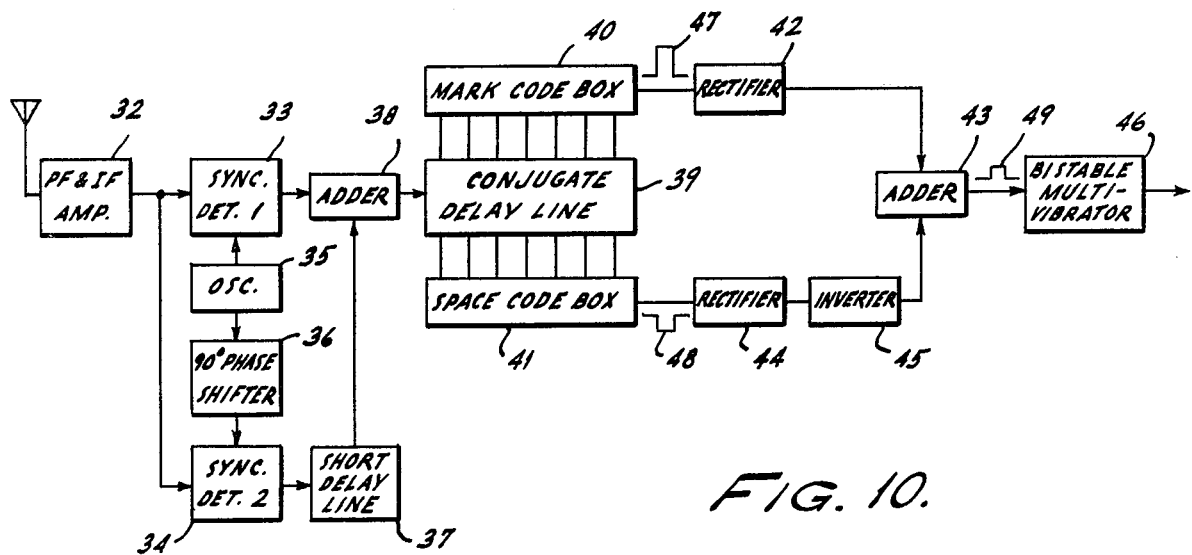

The invention may be fully understood from the following detailed description with reference to the accompanying drawings wherein FIGS. 1 to 8 illustrate how conjugate filters or delay lines are employed in a system according to this invention;

FIG. 9 is a block diagram of transmitter apparatus in a system according to this invention; and FIG. 10 is a block diagram of the receiver apparatus in such system.

Referring first to FIGS. 1 to 4, these figures show how conjugate filters or delay lines may be employed to achieve jam resistant transmission of a pulse which may be representative of a MARK in a complete communication system as hereinafter described. In FIG. 1 there is shown a delay line 10 having equally spaced taps numbered 1 to 7, and having a total delay time T. For simplicity of explanation only seven taps are shown but in actual practice a much greater number would be employed. These taps are connected to an adder 11 and an inverter 12 according to a particular code to produce the result hereinafter described. In the simple illustration of FIG. 1, taps 1, 3, 4 and 5 are connected directly to the adder 11, and taps 2, 6 and 7 are connected to the inverter 12 which in turn is connected to the adder 11. The adder 11, the inverter 12, and the connections to the adder and the inverter constitute a "code box" as indicated by the broken line rectangle 13. The significance of the term "code box" will be seen presently.

Figure 2:
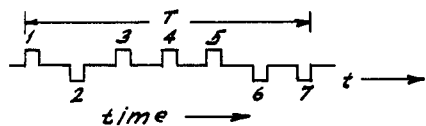

When an input pulse, such as represented at 14, is supplied to the delay line 10, the output of adder 11 is a pseudo-random pulse waveform as shown in FIG. 2 which actually represents a MARK, and which comprises successive pulses numbered in correspondence to the delay line taps. Pulses 1, 3, 4 and 5 are positive, while pulses 2, 6 and 7 are negative due to their inversion by inverter 12.

Figure 3:
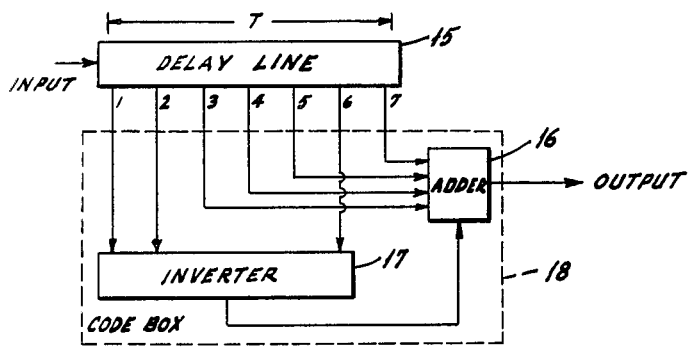

Suppose now that this waveform is transmitted to a receiver delay line as shown at 15 in FIG. 3, which likewise has seven equally spaced taps numbered 1 to 7 and the same total delay time T. Also associated with the delay line 15 are an adder 16 and an inverter 17. In this instance, however, the connections to the adder and the inverter are the reverse of those in FIG. 1. Thus taps 1, 2 and 6 of delay line 15 are connected to the inverter 17, and taps 3, 4, 5 and 7 are connected directly to the adder 16. The adder, the inverter, and the connections constitute a "code box" as indicated by the broken line rectangle 18.

Figure 4:
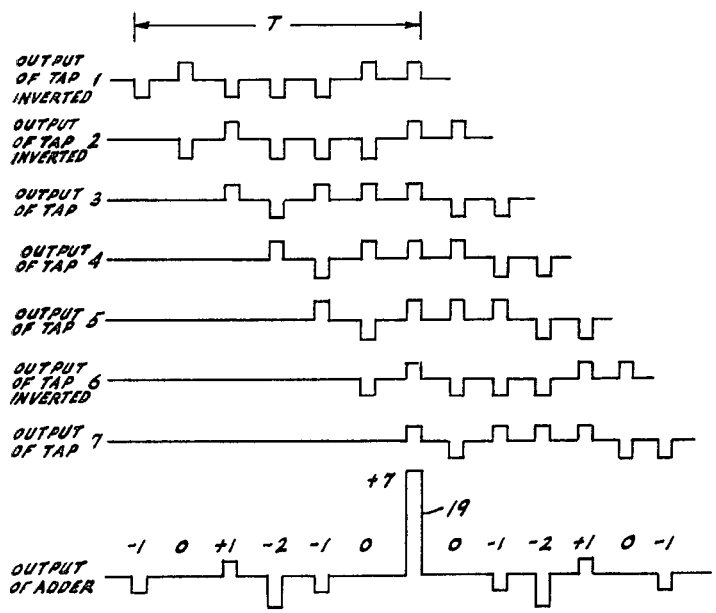

FIG. 4 shows the waveforms which appear at the taps of delay line 15 and also shows the output of adder 16. It will be seen from FIG. 4 that at the end of time T, which is the code time, the output of the adder 16 is a positive pulse 19 having an amplitude which is seven times the amplitude of the individual pulses. At any other time the pulses have a tendency to cancel each other and they produce a smaller output pulse. This cancelling effect is essential to the provision of a jam resistant system. Any jamming pulses likewise tend to cancel one another, since some are positive and some are negative. Thus the pulse 19 representing a MARK is readily distinguishable even in the presence of jamming pulses.

From the foregoing description it will be seen that the term "code box" refers to apparatus by which the polarities of the pulses in a pulse group or train are arranged according to a particular code.

It has been assumed that the code employed in FIGS. 1 and 3 is a MARK code, and that the pulse 19 represents a MARK. FIGS. 5 to 8 show how a different code may be employed for transmission of a SPACE.

Figure 5:
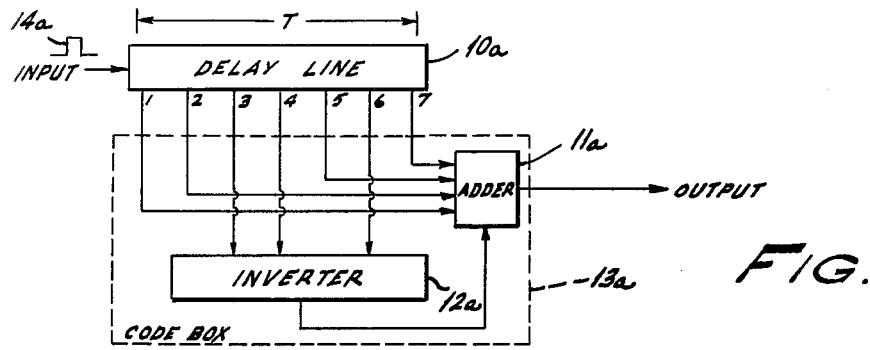
Figure 6:
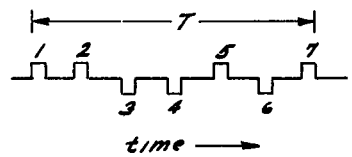

In FIG. 5 the taps of delay line 10a are connected to adder 11a and inverter 12a according to a SPACE code. Thus taps 1, 2, 5 and 7 are connected directly to adder 11a, while taps 3, 4 and 6 are connected to the inverter 12a, to produce the pseudo-random waveform of FIG. 6 which actually represents a SPACE.

Figure 7:
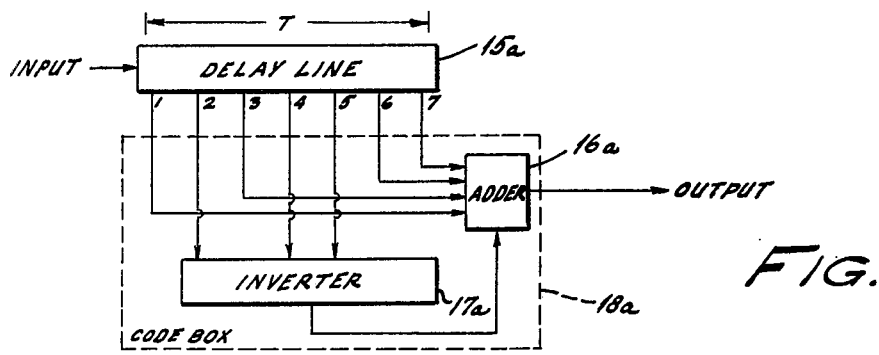
Figure 8:
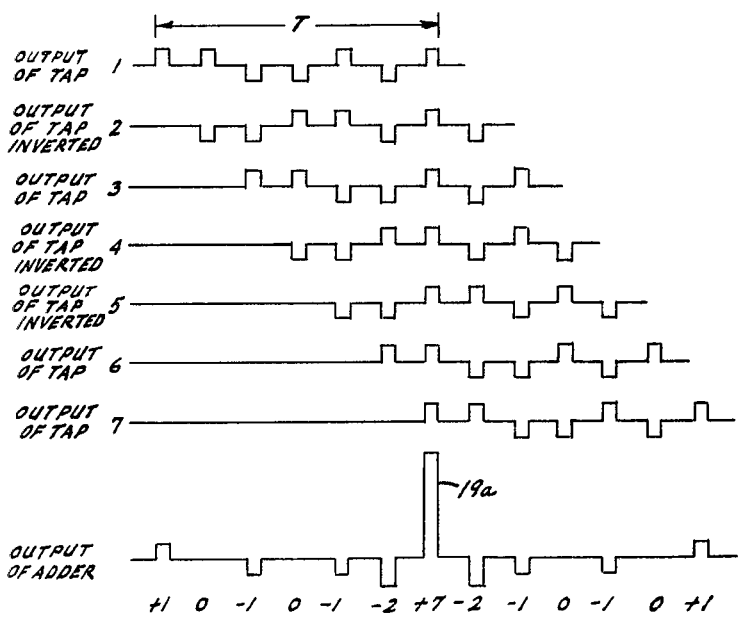

In FIG. 7 the tap connections of the receiver delay line 15a are the reverse of those in FIG. 5. FIG. 8 shows that at the end of time T the output of adder 16a is a positive pulse 19a having an amplitude which is seven times the amplitude of the individual pulses. Pulse 19a represents a SPACE.

Referring now to FIGS. 9 and 10, there is shown a communication system according to the present invention. The transmitter apparatus is shown in FIG. 9. A pulse generator 20 supplies equally time-spaced pulses to a delay line 21 which has equally spaced taps, there being seven taps shown corresponding to those in FIGS. 1 and 5. In this instance the taps are connected to two code boxes 22 and 23 which correspond to the code boxes 13 and 13a in FIGS. 1 and 5. The MARK code box 22 comprises an adder, an inverter, and connections thereto according to a particular code, e.g. as in FIG. 1, to produce at output connection 24, in response to each input pulse, a pseudo-random pulse waveform representing a MARK. The SPACE code box 23 comprises an adder, an inverter, and connections thereto according to a different code, e.g. as in FIG. 5, to produce at output connection 25, in response to each input pulse, a different pseudo-random pulse waveform representing a SPACE.

These waveforms are selected by switching means 26 in response to a digital intelligence signal from source 27 having a baud rate corresponding to the rate of occurrence of the input pulses from generator 20. In the form shown the switching means 26 comprises a pair of vacuum tubes 28 and 29 which are normally non-conductive and are rendered selectively conductive by the digital intelligence signal which is supplied directly to a grid of tube 28 and is supplied in inverted form through inverter 30 to a grid of tube 29. The selected MARK and SPACE waveforms are supplied to a transmitter 31 which may, for example, produce a double-sideband suppressed-carrier signal for transmission via space to a receiver.

FIG. 10 shows the receiver apparatus. The transmitted signal is received and supplied to the RF and IF stages 32 and thence to two synchronous detectors 33 and 34 which are heterodyne converters. A local oscillator 35, having an operating frequency different from the carrier frequency, is connected directly to detector 33 and is connected through a 90° phase shifter 36 to detector 34. The output of each of the two detectors comprises pulses modulated by a sine wave whose frequency is equal to the difference between the carrier frequency and the frequency of oscillator 35. Since these sine wave modulated signals are in quadrature phase relation, there is always a sufficient output from one or the other detector. To prevent interference of these signals with one another in the subsequent apparatus, the output from detector 34 is slightly delayed by a short delay line 37. The two output signals are supplied to an adder 38 which is connected to a conjugate delay line 39 whose taps are connected to the MARK code box 40 and to the SPACE code box 41, which correspond to the code boxes 18 and 18a in FIGS. 3 and 7. Each of these code boxes comprises an adder, an inverter, and connections according to the MARK or SPACE code. The MARK code box is connected to a rectifier 42 which is connected directly to an adder 43. The SPACE code box is connected to a rectifier 44 which is connected to the adder through an inverter 45. The adder is connected to a bistable multivibrator 46.

In this system the employment of the synchronous detectors obviates the need for synchronization between the transmitter and the receiver, and by operating the two detectors in quadrature phase relation it is assured that there is always ample output from one detector or the other. As stated above, the output of each detector comprises pulses modulated by a sine wave. If the frequency of the sine wave is such that the code time T hereinbefore mentioned is always small compared with the half period of the sine wave, the coded pulses will always be within a positive or negative half cycle of the sine wave in the output of one or the other detector. Thus a transmitted pulse train will be present, in the output of one or the other detector, with sufficient pulse amplitude and without changes of polarity within the duration of the pulse train.

The principle of operation of the system shown in FIGS. 9 and 10 is the same as described above in connection with FIGS. 1 to 8. Each MARK is transmitted through the medium of a pseudo-random pulse waveform which actually is formed according to the MARK code. Likewise each SPACE is transmitted through the medium of a pseudo-random pulse waveform which actually is formed according to the SPACE code.

Assuming that in the illustrated system the codes are those of FIGS. 1 to 8, when a MARK is transmitted the MARK code box 40 at the receiver delivers a series of pulses one of which is a relatively high amplitude pulse shown as a positive pulse at 47; and the output of the SPACE code box 41 at the time of pulse 47 is a pulse of much smaller amplitude shown as a negative pulse at 48. However, the polarities are unimportant because the rectifiers 42 and 44 serve to make both pulses the same polarity, e.g. positive. In other words, each rectifier is of the type which will produce an output pulse of predetermined polarity, e.g. positive, regardless of the polarity of the input pulse. The SPACE pulse from rectifier 44 is inverted to opposite polarity, e.g. negative. The resultant output of adder 43 is a positive pulse, as shown at 49, which causes the multivibrator 46 to assume one of its two stable states.

When a SPACE is transmitted, the relative amplitudes of the MARK and SPACE pulses are reversed. Therefore the resultant output of adder 43 is a negative pulse which causes the multivibrator 46 to assume the other of its two stable states.

The output of the multivibrator is therefore a reproduction of the digital signal supplied by source 27 at the transmitter.

By way of example, in practice each of the pulses supplied by the pulse generator 20 may have a time duration of 0.25 microsecond, and the time spacing between consecutive pulses may be 200 microseconds. Each delay line may have a total time delay of 200 microseconds and may have 800 taps so that each pseudo-random waveform comprises 800 pulses. Such a system can tolerate doppler shift approximately equal to the reciprocal of 200 microseconds or up to 5 kc.

From the foregoing description it will be seen that the present invention provides a jam resistant communication system which obviates the need for synchronization between the transmitter and the receiver, and which is not effected by frequency instability and doppler shifts encountered in practice.

While a preferred embodiment of the invention has been illustrated and described, it will be understood that the invention is not limited thereto but contemplates such modifications and further embodiments as may occur to those skilled in the art.

I claim:

1. In a communication system, a first delay line having multiple spaced taps, means for supplying successive input pulses to said delay line, whereby in response to each input pulse variously delayed pulses appear at the taps of said delay line, means for deriving from said taps pulses representative of a MARK, means for also deriving from said taps pulses representative of a SPACE, means for selecting the MARK and SPACE representative pulses according to signal intelligence representable by MARKS and SPACES, means for effecting carrier transmission of the selected pulses, means for receiving the carrier-transmitted pulses, a pair of synchronous detectors, means for supplying the carrier-transmitted pulses to said detectors, means for supplying phase quadrature related local oscillations respectively to said detectors, a second multi-tap delay line which is the conjugate of said first delay line, means for driving said second delay line from said detectors, and means for deriving the transmitted MARK-representative and SPACE-representative pulses from said second delay line.

2. In a communication system, a first delay line having multiple spaced taps, means for supplying successive input pulses to said delay line, whereby in response to each input pulse variously delayed pulses appear at the taps of said delay line, means for deriving from said taps pulses representative of a MARK, means for also deriving from said taps pulses representative of a SPACE, means operable by a binary digital intelligence signal for selecting the MARK and SPACE representative pulses according to the coded intelligence of said signal, means for effecting carrier transmission of the selected pulses, means for receiving the carrier-transmitted pulses, a pair of synchronous detectors, means for supplying the carrier-transmitted pulses to said detectors, means for supplying phase quadrature related local oscillations respectively to said detectors, a second multi-tap delay line which is the conjugate of said first delay line, means for driving said second delay line from said detectors, and means for deriving the transmitted MARK-representative and SPACE-representative pulses from said second delay line.

3. In a communication system, a first delay line having multiple spaced taps, means for supplying successive input pulses to said delay line, whereby in response to each input pulse variously delayed pulses appear at the taps of said delay line, means for deriving from said taps pulses representative of a MARK, means for also deriving from said taps pulses representative of a SPACE, means for selecting the MARK and SPACE representative pulses according to signal intelligence representable by MARKS and SPACES, means for effecting carrier transmission of the selected pulses, means for receiving the carrier-transmitted pulses, a pair of synchronous detectors, means for supplying the carrier-transmitted pulses to said detectors, means for supplying phase quadrature related local oscillations respectively to said detectors, a second multi-tap delay line which is the conjugate of said first delay line, means for driving said second delay line from said detectors, means for deriving from the taps of said second delay line the transmitted pulses representative of a MARK, means for producing a single MARK-representative pulse from the transmitted MARK-representative pulses, means for also deriving from the taps of said second delay line the transmitted pulses representative of a SPACE, and means for producing a single SPACE-representative pulse from the transmitted SPACE-representative pulses.

4. In a communication system, a first delay line having multiple spaced taps, means for supplying successive input pulses to said delay line, whereby in response to each input pulse variously delayed pulses appear at the taps of said delay line, means for deriving the pulses from said taps and for arranging them according to a predetermined code, other means for deriving the pulses from said taps and for arranging them according to another predetermined code, means operable by a digital intelligence signal for selecting the differently-coded pulses, means for effecting carrier transmission of the selected pulses, means for receiving the carrier-transmitted pulses, a pair of synchronous detectors, means for supplying the carrier-transmitted pulses to said detectors, means for supplying phase quadrature related local oscillations respectively to said detectors, a second multi-tap delay line which is the conjugate of said first delay line, means for driving said second delay line from said detectors, code means connected to the taps of said second delay line for deriving pulses corresponding to the first-mentioned coded pulses, and other code means connected to the taps of said second delay line for deriving pulses corresponding to the second-mentioned coded pulses.

5. In a communication system, a first delay line having multiple spaced taps, means for supplying successive input pulses to said delay line, whereby in response to each input pulse variously delayed pulses appear at the taps of said delay line, means for deriving the pulses from said taps and for arranging them according to a predetermined code to represent a MARK, other means for deriving the pulses from said taps and for arranging them according to another predetermined code to represent a SPACE, means for selecting the MARK and SPACE representative pulses according to signal intelligence representable by MARKS and SPACES, means for effecting carrier transmission of the selected pulses, means for receiving the carrier-transmitted pulses, a pair of synchronous detectors, means for supplying the carrier-transmitted pulses to said detectors, means for supplying phase quadrature related local oscillations respectively to said detectors, a second multi-tap delay line which is the conjugate of said first delay line, means for driving said second delay line from said detectors, code means connected to the taps of said second delay line for deriving said MARK-representative pulses, and other code means connected to the taps of said second delay line for deriving said SPACE-representative pulses.

6. In a communication system, a first delay line having multiple spaced taps, means for supplying successive input pulses to said delay line, whereby in response to each input pulse variously delayed pulses appear at the taps of said delay line, means for deriving the pulses from said taps and for arranging them according to a predetermined code to represent a MARK, other means for deriving the pulses from said taps and for arranging them according to another predetermined code to represent a SPACE, means for selecting the MARK and SPACE representative pulses according to signal intelligence representable by MARKS and SPACES, means for effecting carrier transmission of the selected pulses, means for receiving the carrier-transmitted pulses, a pair of synchronous detectors, means for supplying the carrier-transmitted pulses to said detectors, means for supplying phase quadrature related local oscillations respectively to said detectors, a second multi-tap delay line which is the conjugate of said first delay line, means for driving said second delay line from said detectors, code means connected to the taps of said second delay line for deriving a single MARK-representative pulse from the transmitted MARK-representative pulses, and other code means connected to the taps of said second delay line for deriving a single SPACE-representative pulse from the transmitted SPACE-representative pulses.

7. Apparatus for transmitting and receiving a pulse so that it is clearly distinguishable from other pulses that may be received, comprising a first delay line having multiple spaced taps, means for supplying an input pulse to said delay line, whereby time-spaced pulses appear at the taps of said delay line, means connected to said taps for producing a pseudo-random waveform representative of a MARK, other means connected to said taps for producing another pseudo-random waveform representative of a SPACE, means for selecting either of said waveforms for transmission, means for effecting carrier transmission of the selected waveform, means for receiving the carrier-transmitted waveform, a pair of synchronous detectors, means for supplying the carrier-transmitted waveform to said detectors, means for supplying phase quadrature related local oscillations respectively to said detectors, a second multi-tap delay line which is the conjugate of said first delay line, means for supplying the detected waveform to said second delay line, MARK-decoding means connected to the taps of said second delay line, SPACE-decoding means also connected to the taps of said second delay line, and means connected to both of said decoding means for determining whether the received waveform represents a MARK or a SPACE.

8. Apparatus for transmitting and receiving a pulse so that it is clearly distinguishable from other pulses that may be received, comprising a first delay line having multiple spaced taps, means for supplying an input pulse to said delay line, whereby time-spaced pulses appear at the taps of said delay line, means connected to said taps for inverting the polarity of some of said time-spaced pulses according to a predetermined code to produce a pseudo-random waveform representative of a MARK, other means connected to said taps for inverting the polarity of some of said time-spaced pulses according to a different predetermined code to produce another pseudo-random waveform representative of a SPACE, means for selecting either of said waveforms for transmission, means for effecting carrier transmission of the selected waveform, means for receiving the carrier-transmitted waveform, a pair of synchronous detectors, means for supplying the carrier-transmitted waveform to said detectors, means for supplying phase quadrature related local oscillations respectively to said detectors, a second multi-tap delay line which is the conjugate of said first delay line, means for supplying the detected waveform to said second delay line, whereby said waveform appears at each tap of said second delay line, means for inverting the polarity of the waveform appearing at some of the taps of said second delay line according to the first-mentioned code, other means for inverting the polarity of the waveform appearing at some of the taps of said second delay line according to the second-mentioned code, and means for determining whether the received waveform represents a MARK or a SPACE.

9. In a communication system, means for supplying equally time spaced pulses, means responsive to each of said pulses for producing simultaneously two series of pulses, one series comprising positive and negative pulses according to one code to represent a MARK, the other series comprising positive and negative pulses according to another code to represent a SPACE, means for selecting either of said series according to signal intelligence representable by MARKS and SPACES, means for effecting carrier transmission of the selected series, means for receiving the carrier-transmitted series, a pair of synchronous detectors, means for supplying the carrier-transmitted series to said detectors, means for supplying phase quadrature related local oscillations respectively to said detectors, means for deriving the transmitted series of pulses from said detectors, and means for deriving from the transmitted series of pulses a pulse representing a MARK or a SPACE depending on which of the two series of pulses was transmitted.

10. In a communication system, means for supplying equally time spaced pulses, means responsive to each of said pulses for producing simultaneously two series of pulses, one series comprising positive and negative pulses according to one code to represent a MARK, the other series comprising positive and negative pulses according to another code to represent a SPACE, a source of a binary digital intelligence signal, means operable by said signal for selecting either of said series according to the coded intelligence of said signal, means for effecting carrier transmission of the selected series, means for receiving the carrier-transmitted series, a pair of synchronous detectors, means for supplying the carrier-transmitted series to said detectors, means for supplying phase quadrature related local oscillations respectively to said detectors, means for deriving the transmitted series of pulses from said detectors, and means for deriving from the transmitted series of pulses a pulse representing a MARK or a SPACE depending on which of the two series of pulses was transmitted.

11. In a communication system, means for supplying equally time spaced pulses, means responsive to each of said pulses for producing simultaneously two series of pulses, one series comprising positive and negative pulses according to one code to represent a MARK, the other series comprising positive and negative pulses according to another code to represent a SPACE, a source of a binary digital intelligence signal, means operable by said signal for selecting either of said series according to the coded intelligence of said signal, means for effecting carrier transmission of the selected series, means for receiving the carrier-transmitted series, a pair of synchronous detectors, means for supplying the carrier-transmitted series to said detectors, means for supplying phase quadrature related local oscillations respectively to said detectors, means for deriving the transmitted series of pulses from said detectors, means for deriving from the transmitted series of pulses a pulse which is positive or negative depending on which of the two series of pulses was transmitted, and a multivibrator connected to receive said pulse and to reproduce said signal.

* * * * *